Nov. 28, 1961   H. M. McKAY   3,010,699
LANDING GEAR FOR TRAILER
Filed Sept. 3, 1959
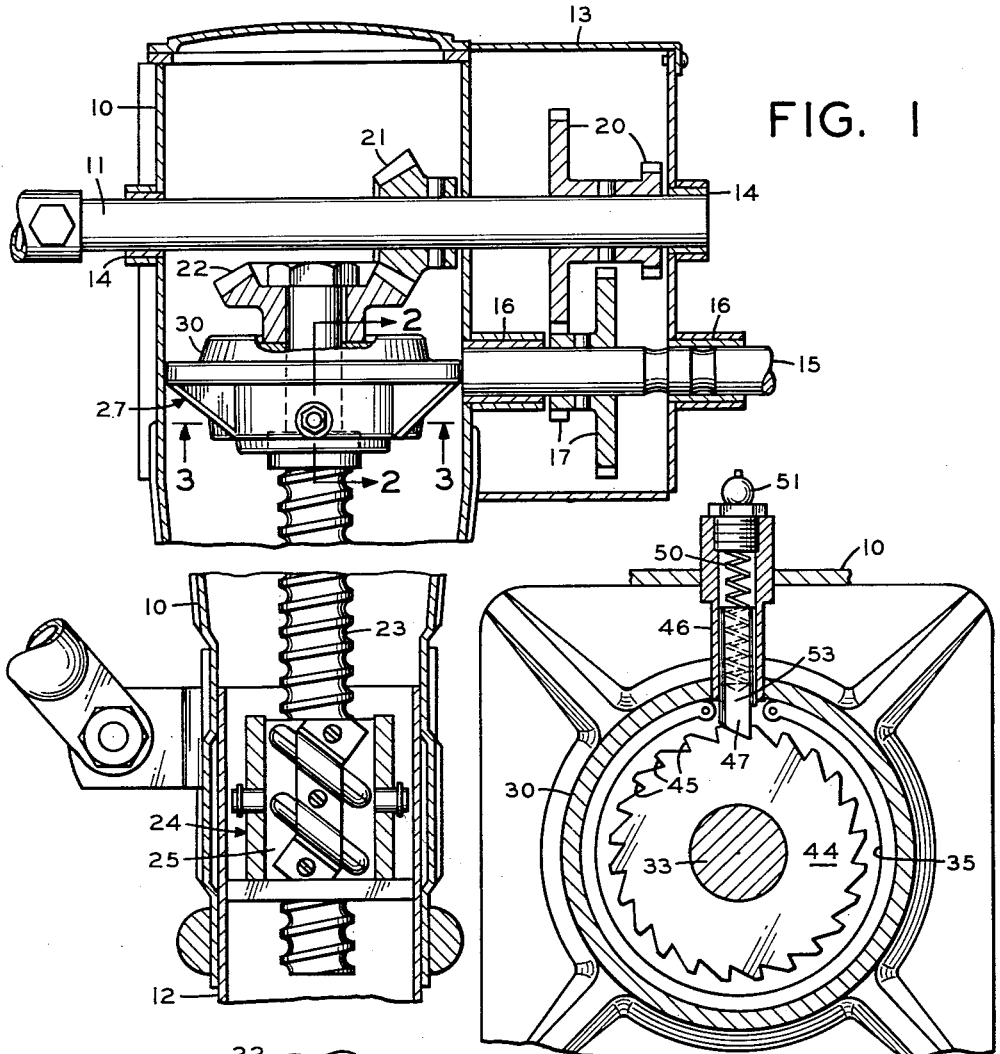
FIG. 1
FIG. 3
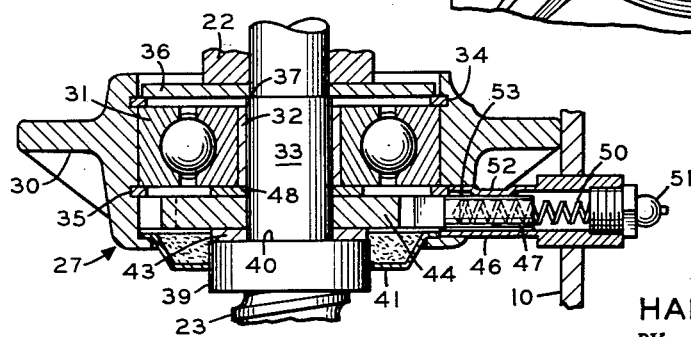
FIG. 2
*INVENTOR.*
HARRY M. McKAY
BY Cohn and Powell
ATTORNEY United States Patent Office 3,010,699
Patented Nov. 28, 1961

3,010,699
LANDING GEAR FOR TRAILER
Harry M. McKay, Warrenton, Mo., assignor to Binkley Mfg. Company, Warrenton, Mo., a corporation of Missouri
Filed Sept. 3, 1959, Ser. No. 837,934
4 Claims. (Cl. 254—86)

This invention relates generally to improvements in a landing gear for trailer, and more particularly to an improved locking mechanism adapted to control the extension and retraction of telescopically related leg sections constituting the landing gear.

It is an important object to provide a landing gear that is adapted to lock automatically when torque is released from the screw operatively interconnecting the telescopically related leg sections so as to preclude unintentional extension of such gear.

Another important objective is achieved by the provision of friction means on the screw that seats and engages a fixed element on one leg section to support the other leg section, and hence acts to prevent such unintentional extension. Other advantages are achieved in that means are provided for permissively turning the screw under a torque greater than the friction means can resist in order to extend the leg sections.

Another important objective is to provide a lock mechanism that operates automatically to prevent unintentional turning of the screw and hence retraction of the leg sections when load pressure is exerted on the landing gear.

Because the screw and the crank utilized to turn the screw are operatively interconnected by a gear train, any slight rotational movement of the screw will result in a greatly magnified rotation of the crank. For example, if the screw were allowed to turn for 120 degrees under up-load pressure on the gear before locking, it would be possible for the crank to turn approximately 360 degrees. This action could present a hazard to the operator in that the crank would kick back after release and possibly cause injury to the hand or arm. It is a major objection of the present invention to provide a locking mechanism that limits the rotational movement of the screw between locking positions to an absolute minimum, thereby precluding any substantial rotative movement or kick-back of the crank.

Yet another important objective is achieved by the provision of a ratchet loosely mounted on screw, a plunger mounted for reciprocal movement into engagement with the ratchet, and friction means on screw clampingly engaging the ratchet upon application of load pressure so that the ratchet operatively engages the plunger to prevent rotation of the screw in one direction and hence prevent retraction of the gear.

Still another important objective is realized by the provision of means for applying a turning force to the screw greater than the last mentioned friction means can resist so that the friction means slips on the ratchet to enable selectively retraction of the leg sections.

Other important advantages are realized in that a ball bearing of very low friction characteristics is utilized on the screw to interconnect the leg sections, the bearing and the screw requiring lubrication for optimum performance. It is an important objective to provide a housing for the ratchet plunger which operatively interconnects the casing carrying the screw to the exterior of the leg section and to provide means in the housing for introducing lubricant therethrough to the screw.

Another important object is to provide a landing gear that is simple and durable in construction, efficient in operation, economical to manufacture, and which is automatic in its locking action.

The foregoing and numerous other objects and advantages of the invention will more clearly appear from the following detailed description of a preferred embodiment, particularly when considered in connection with the accompanying drawing, in which:

FIG. 1 is a fragmentary cross-sectional view of the landing gear taken along a vertical plane passed through its longitudinal axis;

FIG. 2 is an enlarged cross-sectional view of the lock mechanism as seen along line 2—2 of FIG. 1; and FIG. 3 is a cross-sectional view of the lock mechanism as seen along line 3—3 of FIG. 1.

Referring now by characters of reference to the drawing, and first to FIG. 1, it is seen that the landing gear includes a first leg section generally indicated at 10 which is mounted on and pivotally connected to a transverse shaft 11. Telescopically connected to leg section 10 is an extensible leg section referred to at 12, preferably located internally of leg section 10. The extensible leg section 12 closely interfits the internal wall of leg section 10. In the preferred structure, the leg sections 10 and 12 are substantially square in cross section in the areas in which such leg sections interfit so as to prevent relative rotation.

A ground foot or wheel (not shown) is usually attached to the bottom of the extensible leg section 12, but is not disclosed because it is a conventional structure and forms no part of the invention.

A housing 13 is attached to the side of leg section 10 to provide an enclosure for the drive gear train. The cross shaft 11 is rotatively mounted in bearings 14 formed on leg section 10 and on housing 13. Drive shaft 15 is journalled in bearings 16 formed on housing 13. A crank (not shown) is adapted to be attached to drive shaft 15 to rotate the shaft incident to operation of the landing gear.

Drive gears 17 are keyed to shaft 15 and are adapted to mesh selectively with the driven gears 20 keyed to the cross shaft 11. The gears 17 and 20 are located within housing 13. If it is desired to change the drive ratio, the drive shaft 15 may be pulled outward to the right of FIG. 1 so that the other coacting pair of drive and driven gears intermesh.

Fixedly attached to cross shaft 11 and located within the leg section 10, is a bevel gear 21 that intermeshes with a coacting bevel gear 22 keyed to the top of actuating screw 23. The screw 23 operatively interconnects the leg sections 10 and 12 so as to extend and retract the extensible leg section 12.

A continuous ball bearing generally indicated at 24 has its housing 25 fixed to the extensible leg section 12 so as to prevent relative rotation of the bearing housing 25 and of the leg section 12. As is well known in the bearing art, the bearing 24 provides a continuous race of ball bearings adapted to engage the spiral groove provided in the screw 23. Because of the particular structure of this type of ball bearing 24, there is very little friction between the screw 23 and the bearing 24. It is apparent that upon rotation of the screw 23, the bearing 24 is movable down or up depending upon the direction of rotation, whereby to cause extension or retraction of the leg section 12.

The lock mechanism generally referred to at 27 (FIG. 1) is located within the pivoted leg section 10. The lock mechanism 27 includes a casing 30 that is fixed to the inside wall of pivoted leg section 10. The screw 23 extends upwardly through the center of casing 30. The internal mechanism of the lock is best shown in FIGS. 2 and 3.

Located within the housing 30 is a ball-race bearing 31 having one part attached to casing 30 and the other part attached to a sleeve 32 located about shaft portion 33 of screw 23. A snap ring 34 is fixed in an internal groove formed in casing 30 located immediately above the ball bearing 31, the snap ring 34 preventing upward movement of the bearing 31. Another snap ring 35 is similarly located in an annular groove formed internally of casing 30 and engages the lower side of bearing 31 to prevent downward movement of such bearing.

An "up-lock" washer or plate 36, constituting a friction means, is loosely mounted on the shaft portion 33, and is located and held between a shoulder 37 on the screw shaft portion 33 and the lower end of bevel gear 22. The friction plate 36 seats on top of the snap ring 34. Thus it is seen that the snap ring 34 supports the entire weight of the bevel gear 22, screw 23 and the extensible leg section 12.

When the leg section 12 is in retracted position, the entire weight of the leg section 12, screw 23 and bevel gear 22 is supported on the snap ring 34, creating considerable frictional force between the snap ring 34 and the friction plate 36. This frictional force applied by friction plate 36 prevents casual or unintentional rotation of the friction plate 36 and of the screw 23, and hence prevents extension of the leg section 12.

The screw 23 includes a collar 39 that provides an upwardly facing shoulder 40. A grease retainer and lubricant guiding means 41 is fixed to the casing 30 and extends downwardly closely contiguous to the collar 39. Seated on the shoulder 40 of collar 39 is a "down-lock" washer 43 preferably made of brass material, the washer 43 constituting a friction means. Mounted loosely on the screw shaft portion 33 within the casing 30 is a ratchet 44 having a plurality of closely disposed peripheral teeth. A spacer washer 48 is located about the screw shaft portion 33 and located between the ratchet 44 and the lower side of bearing 31. As is best seen in FIG. 2, the ratchet 44 is located between the friction washer 43 and the fixed spacer washer 48. While there is no direct attachment between these elements, the ratchet 44 frictionally engages the friction washer 43.

From FIG. 3 it is seen that the ratchet 44 includes a plurality of peripherally spaced teeth 45 facing in one direction of rotation of screw 23. In the preferred construction, the teeth 45 are located at 15 degree intervals.

A tubular housing 46 is carried by and mounted on the casing 30. One end of tubular housing 46 opens into the interior of casing 30 immediately adjacent the peripheral teeth 46 of ratchet 44. The opposite end of housing 46 extends outwardly of the leg section 10.

Slidably mounted for reciprocal movement in tubular housing 46 is a plunger 47, one end of the plunger 47 extending into the casing 30 for engagement with ratchet teeth 45. A compression spring 50 located within the housing 46 engages the plunger 47 and tends to urge the plunger 47 into engagement with the ratchet 44. For reasons which will later appear, a grease fitting 51 encloses the outer end of plunger 47.

As is best seen in FIG. 2, the housing 46 is provided with a dimple or depression 52 that engages a flat longitudinal surface 53 formed along plunger 47 to prevent the plunger from rotating in the housing 46.

The housing and plunger construction is utilized to lubricate the screw 23. Because the plunger 47 is provided with the flat surface 53, there is a space between the plunger 47 and the housing 46 that provides a lubricant passageway interconnecting the opposite end of the housing 46.

For example, a suitable lubricating tool or gun (not shown) is connected to the lubricant fitting 51 and a supply of lubricant is introduced into the housing 46. The lubricant is moved through the passageway between housing 46 and plunger 47 and out the open end of the housing 46. The lubricant is introduced into the casing 30 and partially guided by retainer 41 is deposited onto the screw 23. Thus it is seen that the internal mechanism of the latch such as the plunger 47 and the screw 23, is lubricated through the plunger-housing assembly.

When the leg sections 10 and 12 are in retracted position, the weight of the wheels and the slidably movable leg section 12 is supported on the retaining ring 34 by the friction washer 36. As stated above, the frictional force between the friction plate 36 and retaining ring 34 prevents the tendency of the screw 23 to rotate and hence precludes the tendency of leg section 12 to extend.

As the operator turns the drive shaft 15 clockwise by means of a crank, the cross shaft 11 is rotated in a counterclockwise direction as viewed from the right hand side in FIG. 1 by the gear train 17 and 20. Consequently the bevel gear 21 is driven in a counterclockwise direction, and bevel gear 22 is driven in a counterclockwise direction as viewed from the top in FIG. 1. Because the friction washer 36 is sandwiched between the bevel gear 22 and the shoulder 37 of the screw shaft portion 33, the friction washer 36 slips on the surface of retaining ring 34 to permit the rotation of screw 23 and hence the extension of the leg section 12.

During the counterclockwise rotation of the screw 23, ratchet 44 fitted between the friction washer 43 and the bearing 31 is allowed to rotate freely because the ratchet teeth 45 engage the plunger 47 with a camming action to push the plunger rearwardly under spring loading.

The "down-lock" assembly becomes effective after the desired extension of leg section 12 is obtained by the up-load pressure on the wheels and hence on the leg section 12. This up-load or retracting pressure on the leg section 12 tends to turn the screw 23 in a clockwise direction. The weight of the trailer represents a down force on the landing gear housing and represents an up-load applied on the wheels and leg section 12. Upon application of this up-load pressure, the screw shoulder 41 urges the friction washer 43 tightly against the ratchet 44, thus providing a drive connection between the screw 23 and ratchet 44 so that the ratchet 44 rotates therewith.

When the manual turning force is released from the screw 23 incident to extension of leg section 12, and an up-load is exerted on such leg section 12, the tendency will be for the screw 23 to rotate in the opposite direction. Under the conditions set forth above, the ratchet 44 will rotate in clockwise direction as viewed from the top in FIGS. 1 and 3 until the closest ratchet tooth operatively engages the end of plunger 47. This interengagement between the ratchet and plunger precludes further rotation of screw 23, and hence stops retraction of the leg section 12 under up-load pressure. In addition, because of the close arrangement of the peripheral teeth 45, the ratchet 44 will rotate only a very slight distance, as for example 15 degrees, and the crank turning the drive shaft 15 will consequently move only a short distance of say 45 degrees.

To retract the leg section 12 while under a load, the operator rotates the screw 23 in a clockwise direction by means of the gear drive mechanism and thus is able to create more torque on the screw 23 than the friction washer 43 can resist, thereby causing friction washer 43 to slip on the ratchet 44 and causing the screw 23 to rotate relative to ratchet 44. After the leg section 12 is retracted sufficiently so that it is no longer under an up-load pressure, the friction washer 43 slips on the ratchet 44 more easily and enables ready retraction of the leg section 12 to a fully retracted position.

Although the invention has been described by making detailed reference to a single preferred embodiment, such detail is to be understood in an instructure, rather than in any restrictive sense, may variants being possible within the scope of the claims hereunto appended.

I claim as my invention:

1. In a landing gear for trailer, a pair of leg sections telescopically interfitted, a screw operatively interconnecting said leg sections for extending and retracting said leg sections upon rotation of said screw, a ratchet loosely mounted for rotation on said screw, a casing fixed to one leg section, a tubular housing fixed to said casing and extending radially from said ratchet, a plunger slidably received in said housing, resilient means engaging said plunger and tending to urge the plunger into engagement with said ratchet, the screw being provided with a shoulder, a friction means on said shoulder engaging one side of said ratchet, means fixed in said casing engaging the other side of said ratchet, said shoulder urging said friction means into clamping engagement with said ratchet upon exertion of up-load pressure on the leg sections, the plunger and ratchet engaging to lock said ratchet in one direction upon exertion of such up-load pressure, and means operatively connected to said screw for selectively turning the screw in a direction in which it is normally locked under a torque greater than the friction means can resist, whereby to cause slipping of the friction means on the ratchet incident to retraction of the leg sections.

2. In a landing gear for trailer, a pair of leg sections telescopically interfitted, a screw operatively interconnecting said leg sections for extending and retracting said leg sections upon rotation of said screw, a ratchet loosely mounted for rotation on said screw, a casing fixed to one leg section and enclosing said ratchet, a tubular housing fixed to said casing in one position at all times and extending radially from said ratchet, a plunger slidably received in said housing, resilient means in said housing engaging said plunger and tending to urge the plunger into engagement with said ratchet, means in said tubular housing providing a passageway for lubricant into said casing and onto said plunger, ratchet and screw, and means frictionally clamping said ratchet to said screw upon exertion of up-load pressure on the leg sections.

3. In a landing gear for trailer, a pair of leg sections telescopically interfitted, a casing fixed to one leg section, a screw extending through said casing and rotatively mounted in said casing, a ratchet in said casing loosely mounted on said screw, a roller bearing fixed to the other said leg section and engaging the screw for relative longitudinal movement along said screw upon rotation, a tubular housing fixed to said casing in one position at all times and extending radially outward from said ratchet, a plunger slidably received in said housing, resilient means engaging said plunger and tending to urge the plunger into engagement with said ratchet, means in said tubular housing providing a passageway for lubricant to said plunger, ratchet and to said screw for lubricating said bearing, and means frictionally clamping said ratchet to said screw upon exertion of up-load pressure on the leg sections.

4. In a landing gear for trailer, a pair of leg sections telescopically interfitted, a casing fixed to one leg section, a screw rotatively mounted in said casing and extending therethrough, a roller bearing fixed to the other said leg section and engaging the screw for relative longitudinal movement along said screw upon rotation incident to extending and retracting said leg sections, a ratchet in said casing loosely mounted for rotation on said screw, a tubular housing fixed to said casing in one position at all times immediately adjacent said ratchet, a plunger slidably received for reciprocal movement in said housing, a spring in said housing engaging said plunger and tending to urge said plunger into engagement with said ratchet, the tubular housing and plunger being spaced to provide a passageway longitudinally communicating with said casing for introducing lubricant to said plunger, ratchet and to said screw for lubricating said bearing, the screw being provided with a shoulder, a friction means on said shoulder engaging one side of said ratchet, means fixed in said casing engaging the other side of said ratchet, said shoulder urging said friction means into clamping engagement with said ratchet upon exertion of up-load pressure on the leg sections, the plunger and ratchet engaging to lock said ratchet in one direction upon exertion of such up-load pressure.

References Cited in the file of this patent

UNITED STATES PATENTS

| | | |
|---|---|---|
| 1,019,095 | Smythe | Mar. 5, 1912 |
| 1,989,251 | Snell et al. | Jan. 29, 1935 |
| 2,655,340 | Dalton | Oct. 13, 1953 |